US010936200B2

(12) United States Patent
Romem et al.

(10) Patent No.: US 10,936,200 B2
(45) Date of Patent: Mar. 2, 2021

(54) SYSTEM AND METHOD FOR IMPROVED RDMA TECHNIQUES FOR MULTI-HOST NETWORK INTERFACE CONTROLLERS (71) Applicant: Excelero Storage Ltd., Tel Aviv (IL)

(72) Inventors: Yaniv Romem, Jerusalem (IL); Omri Mann, Jerusalem (IL); Ofer Oshri, Kfar Saba (IL); Kirill Shoikhet, Raanana (IL)

(73) Assignee: EXCELERO STORAGE LTD., Tel Aviv (IL)

( * ) Notice: Subject to any disclaimer, the term of this patent is extended or adjusted under 35 U.S.C. 154(b) by 0 days.

(21) Appl. No.: 16/270,239

(22) Filed: Feb. 7, 2019

(65) Prior Publication Data

US 2019/0187916 A1 Jun. 20, 2019

Related U.S. Application Data (63) Continuation-in-part of application No. 15/975,379, filed on May 9, 2018, now Pat. No. 10,788,992, which is a continuation of application No. 14/726,919, filed on Jun. 1, 2015, now Pat. No. 9,971,519, application No. 16/270,239, which is a
(Continued)

(51) Int. Cl.
*G06F 3/06* (2006.01)
*G06F 15/167* (2006.01)
*G06F 12/1081* (2016.01)
*H04L 29/08* (2006.01)
*H04L 12/64* (2006.01)
(Continued)

(52) U.S. Cl.
CPC .......... *G06F 3/0611* (2013.01); *G06F 3/0604* (2013.01); *G06F 3/064* (2013.01); *G06F 3/065* (2013.01); *G06F 3/067* (2013.01); *G06F 3/0637* (2013.01); *G06F 3/0647* (2013.01); *G06F 3/0652* (2013.01); *G06F 3/0659* (2013.01); *G06F 3/0688* (2013.01); *G06F 3/0689* (2013.01); *G06F 12/1081* (2013.01); *G06F 15/167* (2013.01); *G06F 15/17331* (2013.01); *H04L 12/06* (2013.01); *H04L 12/6418* (2013.01); *H04L 67/1097* (2013.01); *G06F 2212/65* (2013.01)

(58) Field of Classification Search
CPC combination set(s) only.
See application file for complete search history.

(56) References Cited

U.S. PATENT DOCUMENTS 5,309,451 A  5/1994 Noya et al.
5,717,691 A  2/1998 Dighe et al.
(Continued)

OTHER PUBLICATIONS

Sathiamoorthy, et al., "XORing Elephants: Novel Erasure Codes for Big Data", Proceedings of the VLDB Endowment, vol. 6, No. 5, 2013, pp. 325-336.

*Primary Examiner* — El Hadji M Sall
(74) *Attorney, Agent, or Firm* — M&B IP Analysts, LLC (57) ABSTRACT

A system and method for improved remote direct memory access (RDMA) for multi-host network interface controllers (NIC), the method including: allocating a first key to a first host, the first key corresponding to a first address of a memory device of the first host; and allocating the first key to a second host, wherein the second host is an RDMA NIC (rNIC) configured to offload at least a portion of storage operations from the first host.

11 Claims, 6 Drawing Sheets

Related U.S. Application Data continuation-in-part of application No. 15/684,439, filed on Aug. 23, 2017, now Pat. No. 10,565,054, and a continuation-in-part of application No. 14/934,830, filed on Nov. 6, 2015, now Pat. No. 10,237,347.

(60) Provisional application No. 62/629,825, filed on Feb. 13, 2018, provisional application No. 62/381,011, filed on Aug. 29, 2016, provisional application No. 62/172,265, filed on Jun. 8, 2015, provisional application No. 62/126,920, filed on Mar. 2, 2015, provisional application No. 62/119,412, filed on Feb. 23, 2015, provisional application No. 62/096,908, filed on Dec. 26, 2014, provisional application No. 62/085,568, filed on Nov. 30, 2014, provisional application No. 62/030,700, filed on Jul. 30, 2014.

(51) Int. Cl.
 *H04L 12/06* (2006.01)
 *G06F 15/173* (2006.01)

(56) References Cited

U.S. PATENT DOCUMENTS

| | | |
|---|---|---|
| 5,745,671 A | 4/1998 | Hodges |
| 5,805,788 A | 9/1998 | Johnson |
| 5,889,934 A | 3/1999 | Peterson |
| 6,108,812 A | 8/2000 | Born |
| 6,839,803 B1 | 1/2005 | Loh et al. |
| 7,515,612 B1 | 4/2009 | Thompson |
| 7,539,780 B2 | 5/2009 | Makhervaks et al. |
| 7,577,667 B2 | 8/2009 | Hinshaw et al. |
| 7,590,768 B2 | 9/2009 | Gormley |
| 7,710,968 B2 | 5/2010 | Cornett et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,265,095 B2 | 9/2012 | Fritz et al. |
| 8,307,271 B1 | 11/2012 | Liu et al. |
| 8,407,448 B1 | 3/2013 | Hayden et al. |
| 8,433,848 B1 | 4/2013 | Naamad et al. |
| 8,706,962 B2 | 4/2014 | Belluomini et al. |
| 8,775,718 B2 | 7/2014 | Kanevsky et al. |
| 8,832,216 B2 | 9/2014 | Bugge |
| 8,910,031 B1 | 12/2014 | Liu et al. |
| 9,241,044 B2 | 1/2016 | Shribman et al. |
| 9,462,308 B2 | 10/2016 | LaBosco et al. |
| 9,467,511 B2 | 10/2016 | Tamir et al. |
| 9,467,512 B2 | 10/2016 | Tamir et al. |
| 9,529,773 B2 | 12/2016 | Hussain et al. |
| 9,639,457 B1 | 5/2017 | Piszczek et al. |
| 2005/0038850 A1 | 2/2005 | Oe et al. |
| 2005/0129039 A1 | 6/2005 | Biran et al. |
| 2006/0059408 A1 | 3/2006 | Chikusa et al. |
| 2006/0230219 A1 | 10/2006 | Njoku et al. |
| 2006/0235999 A1 | 10/2006 | Shah et al. |
| 2008/0109616 A1 | 5/2008 | Taylor |
| 2008/0126509 A1 | 5/2008 | Subramanian et al. |
| 2008/0181245 A1 | 7/2008 | Basso et al. |
| 2009/0300023 A1* | 12/2009 | Vaghani ............... G06F 3/0607 |
| 2011/0131377 A1 | 6/2011 | Gray et al. |
| 2012/0079143 A1 | 3/2012 | Krishnamurthi et al. |
| 2012/0144233 A1 | 6/2012 | Griffith et al. |
| 2012/0300633 A1 | 11/2012 | Friedman et al. |
| 2013/0019032 A1 | 1/2013 | Han et al. |
| 2013/0054726 A1 | 2/2013 | Bugge |
| 2013/0073821 A1 | 3/2013 | Flynn et al. |
| 2013/0198311 A1 | 8/2013 | Tamir et al. |
| 2013/0198312 A1 | 8/2013 | Tamir et al. |
| 2013/0254321 A1 | 9/2013 | Johnsen et al. |
| 2013/0262614 A1 | 10/2013 | Makhervaks et al. |
| 2014/0089444 A1 | 3/2014 | Makhervaks et al. |
| 2014/0211808 A1* | 7/2014 | Koren ............... H04L 49/356 370/401 |
| 2014/0297982 A1 | 10/2014 | Duzett |
| 2014/0317336 A1 | 10/2014 | Fitch et al. |
| 2015/0006663 A1 | 1/2015 | Huang |
| 2015/0026286 A1 | 1/2015 | Sharp et al. |
| 2015/0030034 A1 | 1/2015 | Bogdanski et al. |
| 2015/0089121 A1 | 3/2015 | Coudhury et al. |
| 2015/0319237 A1 | 11/2015 | Hussain et al. |
| 2016/0034418 A1 | 2/2016 | Romem et al. |
| 2016/0036913 A1 | 2/2016 | Romem et al. |
| 2016/0057224 A1 | 2/2016 | Ori |
| 2016/0253267 A1 | 9/2016 | Wood et al. |
| 2016/0266965 A1 | 9/2016 | B et al. |
| 2016/0371226 A1 | 12/2016 | Shalf et al. |
| 2017/0093792 A1 | 3/2017 | Marom |
| 2017/0134269 A1 | 5/2017 | Bogdanski et al. |
| 2017/0187496 A1 | 6/2017 | Shalev et al. |
| 2017/0289036 A1 | 10/2017 | Vasudevan |
| 2018/0293188 A1 | 10/2018 | Katayama |

* cited by examiner

SYSTEM AND METHOD FOR IMPROVED RDMA TECHNIQUES FOR MULTI-HOST NETWORK INTERFACE CONTROLLERS

CROSS-REFERENCE TO RELATED APPLICATIONS

This application claims the benefit of U.S. Provisional Application No. 62/629,825 filed on Feb. 13, 2018, the contents of which are hereby incorporated by reference. This application is also a continuation in part of:

(a) U.S. patent application Ser. No. 15/975,379 filed on May 9, 2018, now pending, which is a continuation of U.S. patent application Ser. No. 14/726,919 filed Jun. 1, 2015 now U.S. Pat. No. 9,971,519, which claims the benefit of U.S. Provisional Application Nos.: 62/126,920 filed on Mar. 2, 2015, 62/119,412 filed on Feb. 23, 2015, 62/096,908 filed on Dec. 26, 2014, 62/085,568 filed on Nov. 30, 2014, and 62/030,700 filed Jul. 30, 2014;

(b) U.S. patent application Ser. No. 14/934,830 filed on Nov. 6, 2015, which claims the benefit of U.S. Provisional Application 62/172,265 filed Jun. 8, 2015; and (c) U.S. patent application Ser. No. 15/684,439 filed Aug. 23, 2017, which claims the benefit of U.S. Provisional Application No. 62/381,011 filed Aug. 29, 2016.

All of the applications referenced above are herein incorporated by reference.

TECHNICAL FIELD

The present disclosure relates generally to remote direct memory access (RDMA) operations and particularly to improved RDMA techniques utilizing network interface controllers having onboard processors.

BACKGROUND

Remote direct memory access (RDMA) allows a client device to access remote memory devices over a network supporting such features using a RDMA network interface controller (rNIC). There are protocols extending the remote memory access functionality of RDMA to storage access, for example non-volatile memory express (NVMe)-over-Fabrics. While this is advantageous in itself, approaches implemented to date use significant processing resources of the client device's central processing unit (CPU) to provide some storage services. As such, 'smart' rNICs (SmartNICs) have been proposed as a solution, which include an onboard processor to offload at least a portion of the client CPU's operations to the rNIC.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for improved remote direct memory access (RDMA) for multi-host network interface controllers (NIC), the method including: allocating a first key to a first host, the first key corresponding to a first address of a memory device of the first host; and allocating the first key to a second host, wherein the second host is an RDMA NIC (rNIC) configured to offload at least a portion of storage operations from the first host.

Certain embodiments disclosed herein also include a non-transitory computer readable medium having stored thereon instructions for causing a processing circuitry to perform a process, the process including: allocating a first key to a first host, the first key corresponding to a first address of a memory device of the first host; and allocating the first key to a second host, wherein the second host is an RDMA NIC (rNIC) configured to offload at least a portion of storage operations from the first host.

Certain embodiments disclosed herein also include a system for multi-host network interface controllers (NIC), including: a processing circuitry; and a memory, the memory containing instructions that, when executed by the processing circuitry, configure the system to: allocate a first key to a first host, the first key corresponding to a first address of a memory device of the first host; and allocate the first key to a second host, wherein the second host is an RDMA NIC (rNIC) configured to offload at least a portion of storage operations from the first host.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include network interface controllers (NICs) that include an onboard processor capable of offloading remote direct memory access (RDMA) operations from the main processor of a client device. The rNIC defines each processor as a host and allocates addresses in a memory, which are addressable by a key. The present disclosure suggests utilizing a single key per address, allowing the main processor and the rNIC processor to generate instructions based on a single key. This improves the efficiency and speed of the operations between a client device and a remote storage device, accessible over a network.

Figure 1:
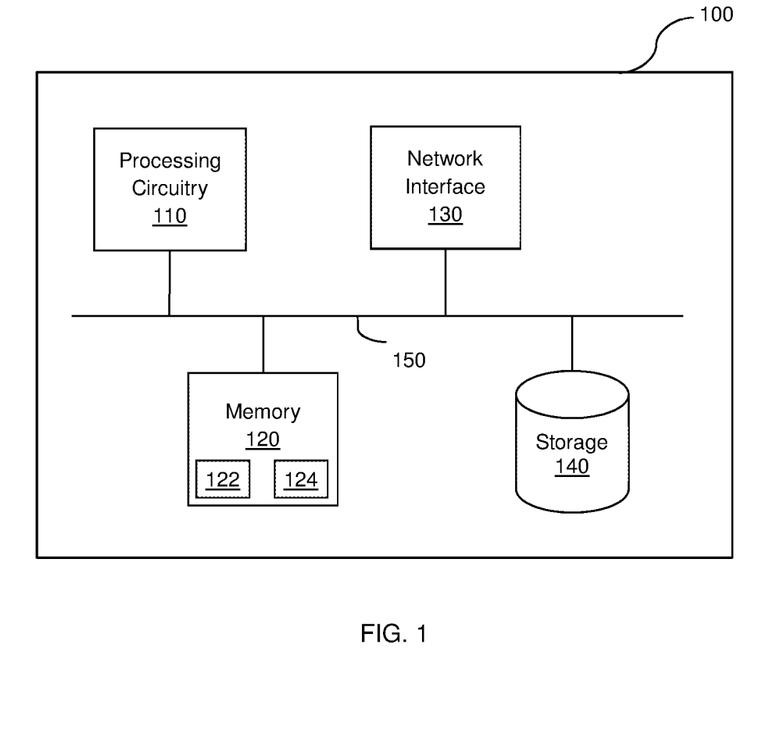
FIG. 1 is an example schematic illustration of a client device configured to provide improved remote direct memory access operations, implemented according to an embodiment.

FIG. 1 is an example schematic illustration of a client device 100 configured to provide improved remote direct memory access operations, implemented according to an embodiment. The client device 100 includes at least one processing circuitry (or processor) 110, for example, a central processing unit (CPU). In an embodiment, the processing circuitry 110 may be, or be a component of, a larger processing unit implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing circuitry 110 is coupled via a bus 105 to a memory 120. The memory 120 may include a memory portion 122 that contains instructions that when executed by the processing circuitry 110 performs the method described in more detail herein. The memory 120 may be further used as a working scratch pad for the processing circuitry 110, a temporary storage, and others, as the case may be. The memory 120 may be a volatile memory such as, but not limited to random access memory (RAM), or non-volatile memory (NVM), such as, but not limited to, flash memory. Memory 120 may further include a memory portion 124 containing addresses which can be associated with keys allocated from an NIC 130, to which the processing circuitry 110 is further coupled to.

The NIC 130 is further discussed below, and may provide connectivity over a network to one or more storage servers. The processing circuitry 110 may be coupled to a storage 140, which may be used for the purpose of holding a copy of the method executed in accordance with the disclosed technique. The storage 140 may also be used for storing therein data blocks received over a network from a storage server. The processing circuitry 110 and/or the memory 120 may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described in further detail herein.

Figure 2:
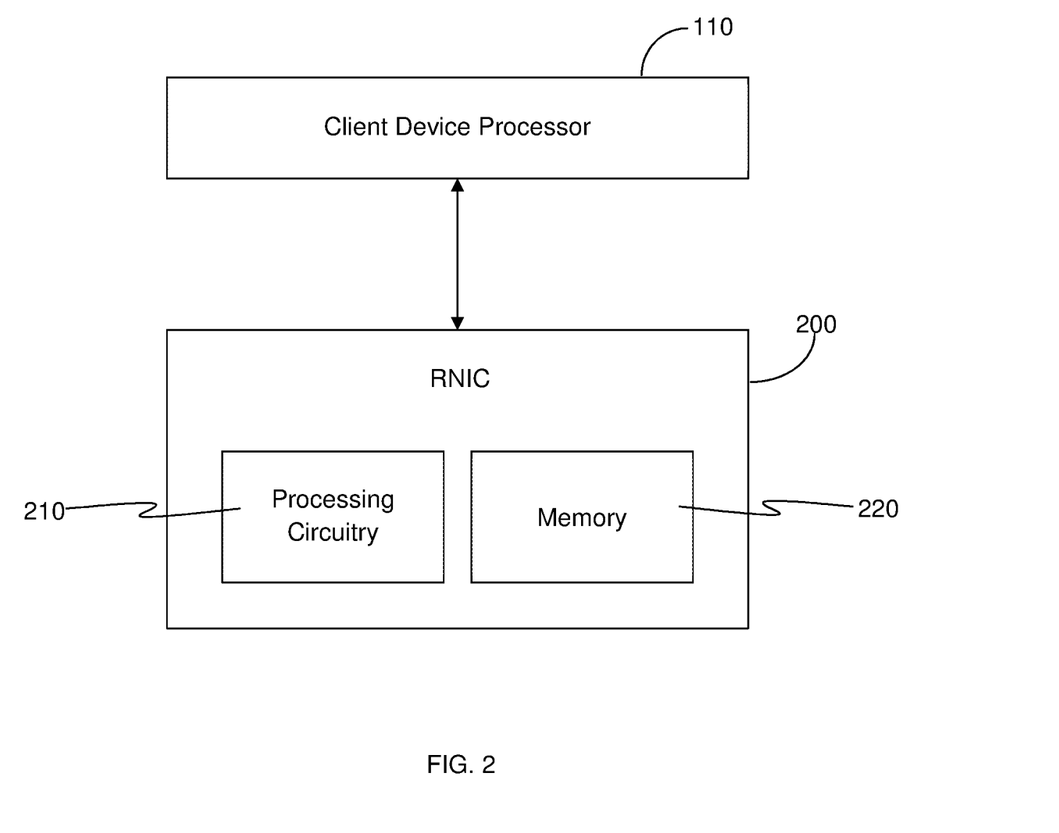
FIG. 2 is an example schematic illustration of an RDMA NIC (rNIC), implemented in accordance with an embodiment.

FIG. 2 is an example schematic illustration of an remote direct memory access (RDMA) network interface controller, or an rNIC 200, implemented in accordance with an embodiment. An rNIC 200 includes a processing circuitry 210, and a memory 220. In an embodiment, the processing circuitry 210 may be, or be a component of, a larger processing unit implemented with one or more processors.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The rNIC 200 is configured to offload at least a portion of the storage operations of a client device to utilize less resources of the client device processor when performing various storage tasks. The rNIC 200 is connected to a client processor device, such as the processing circuitry 110 of the client device 100 of FIG. 1. The client device 100 may initiate an operation to read or write from or to a remote storage device, which may be connected to a remote storage server. The operations and instructions required to retrieve a remote data block may be performed by the rNIC processing circuitry 210 rather than the client device processing circuitry 110 in order to increase processing efficiency.

The client device processing circuitry 110 may be defined by the rNIC 200 as a first host, with the rNIC 200 processing circuitry 210 being defined as a second host. Typically, each host is allocated a plurality of keys by the rNIC 200, where each key corresponds to a single address in a memory, such as memory 120 of the client device 100. For example, the first host may request a remote data block be fetched, i.e., read, from a remote storage device to a first key, corresponding to a first address of the memory into which the remote data block should be read. The rNIC will receive the request, and then send an RDMA request with a second key corresponding to a second address, to the remote storage server to read the block into the second address.

A third operation will be initiated to move the data block from the second address to the first address, in order to complete the operation. This approach includes multiple reads and memory allocations, and it may be beneficial to avoid at least some of these operations in order to increase the efficiency of the process. For example, by allocating a first key to a first host corresponding to a first address, and allocating a second key to a second host corresponding to the first address, the second host is able to send the remote storage server an RDMA request to read data directly into the first memory address, without having to go through the second memory address. This may increase the total speed of the transaction.

Figure 3:
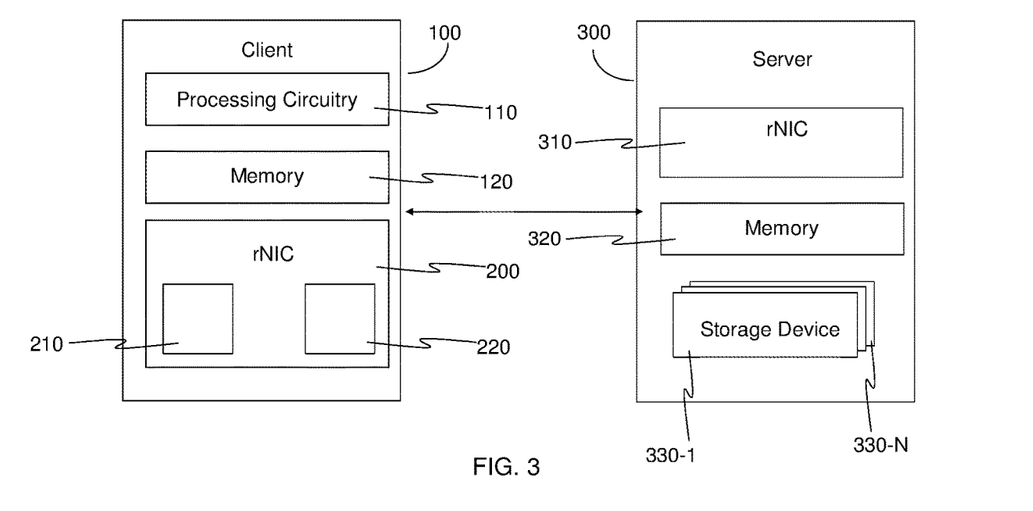
FIG. 3 is an example illustration of a client device communicating with a remote storage server, implemented in accordance with an embodiment.

FIG. 3 is an example schematic illustration of a client device 100 communicating with a remote storage server 300, implemented in accordance with an embodiment. The client device 100 includes a processing circuitry 110, memory 120, and an rNIC 200. The rNIC 200 includes an rNIC processing circuitry 210 and an rNIC memory 220 (as discussed in more detail with respect to FIG. 2 above).

The client device 100 is connected to a storage server 300, e.g., via an network connection. The storage server 300 includes a storage rNIC 310, a storage memory 320, and a plurality of storage devices 330-1 through 330-N, where N is an integer equal to or greater than 1, generally referred to as storage device 330. A storage device 330 may be, for example, a solid state storage device (SSD), and may be addressable as a plurality of data blocks with associated addresses.

The client device 100 may initiate a storage operation, such as a read operation, with a storage device 330. Typically, the client device processor 110 will send a request to read a data block from a remote storage 330. The request may include a key which is associated with an address of a memory 120 of the client device to which the data block is to be written. In some RDMA schemes, the rNIC 200 is configured to then send a request to the storage server 300 using a second key associated with a second address of the memory 120, or associated with a first address of memory 220. The storage server 300 reads the data block from the storage device 310, and sends the data block to the address associated with the second key. The rNIC 200 will then send the data block from the address associated with the second key to the address associated with the first key. This is wasteful of system resources, such as incurring unnecessary write operations, which not only add unnecessary time to the operation, but execute superfluous write commands that can accelerating drive failure. In embodiments where the second key is associated with a first address of the rNIC memory 220, a further write operation is required between the rNIC memory 220 and the client device memory 120. This may introduce a further bottleneck, and will unnecessarily limit the operation to the speed of whichever memory is slower (typically, the memory 220 of the rNIC 200 is slower).

Therefore it is proposed that the rNIC 200 associate the first key and the second key with a first address of the memory 120. This way, when the rNIC 310 of the storage server 300 performs the read operation, the data block will be written directly to its final destination. In some embodiments, the client device 100 may be a virtual machine, container, or other such virtualization. In such embodiments, the client device 100 is not an actual physical machine, but rather a virtualization itself, which may be identifiable to the rNIC 200 as a machine. In such embodiments, a plurality of virtualizations may each communicate as a host with the rNIC 200, for example as a single-root I/O virtualization.

Figure 4:
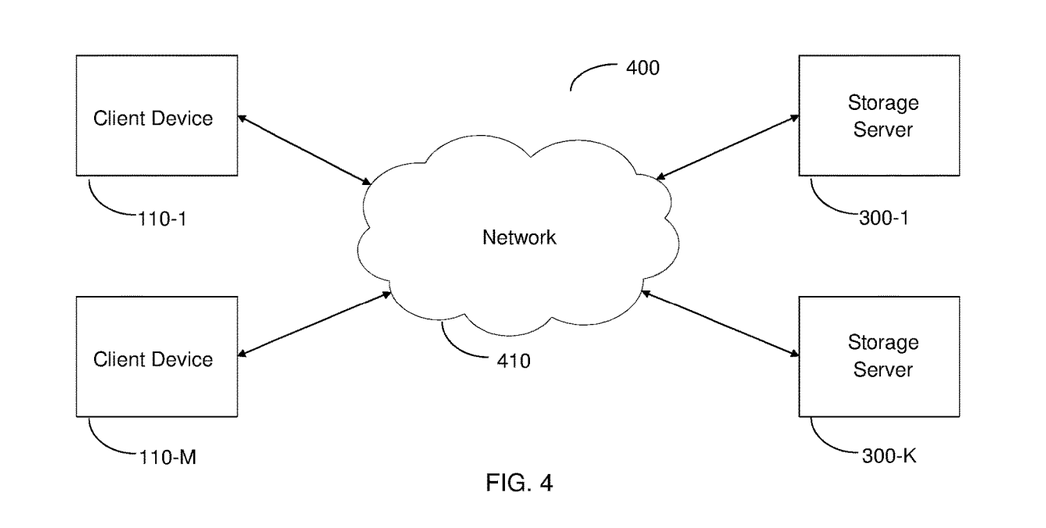
FIG. 4 is an example illustration of an RDMA-supporting network environment, implemented in accordance with an embodiment.

FIG. 4 is an example schematic illustration of an RDMA-supporting network 400 utilized to describe the various embodiments. A plurality of client devices 100-1 through 100-M are communicatively coupled with an RDMA-capable network environment 410, where M is an integer equal to or greater than 1. In an embodiment, the plurality of client devices 100 may implement one or more RDMA protocols.

In an embodiment, the network 410 may be configured to provide connectivity of various sorts, as may be necessary, including but not limited to, wired and/or wireless connectivity, such as, for example, local area network (LAN), wide area network (WAN), metro area network (MAN), worldwide web (WWW), Internet, and any combination thereof, as well as cellular connectivity.

The network 410 further provides connectivity to a plurality of storage servers 300-1 through 300-K, where K is an integer equal to or greater than 1. Each storage server 300 includes one or more storage devices, as shown in FIG. 3, accessible to a client device 100 via the network 410. It should be readily understood that in some embodiments, a first storage server 300-1 may be a client device of a second storage server 300-K, or vice versa. In some embodiments, the various storage devices of one or more storage servers may be deployed in various redundancy schemes, including mirroring, striping, parity, and combinations thereof.

Figure 5:
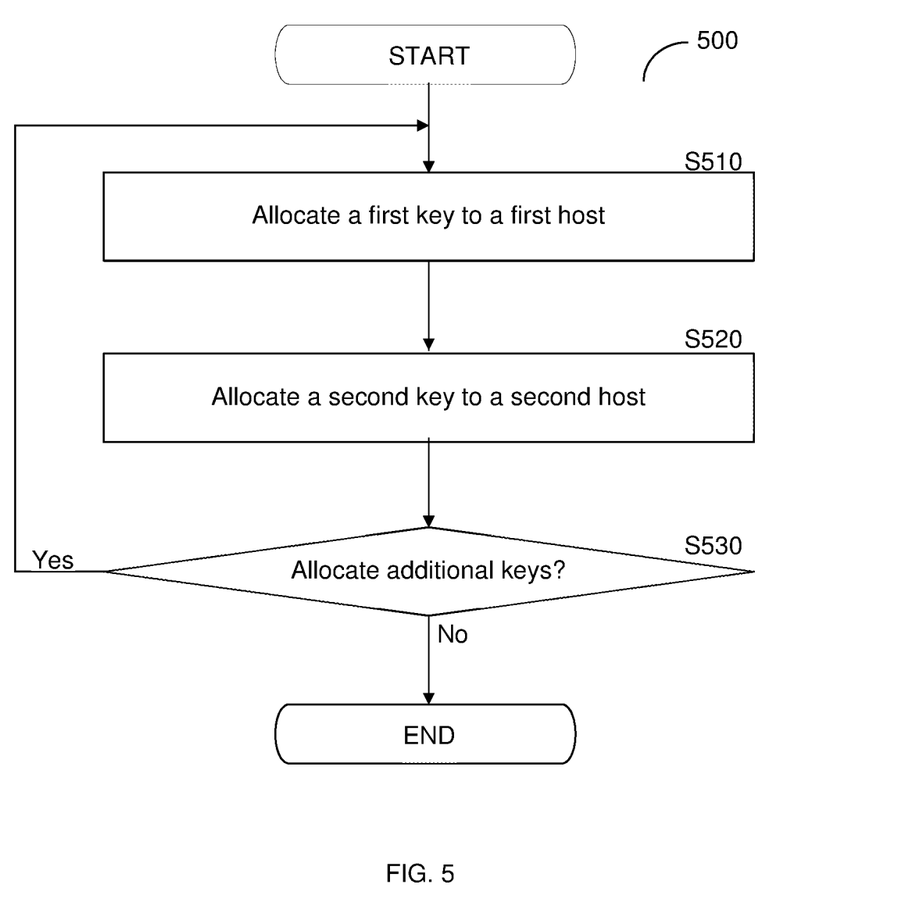
FIG. 5 is an example flowchart describing a method for increasing efficiency of storage operations, implemented in accordance with an embodiment.

FIG. 5 is an example flowchart 500 describing a method for increasing efficiency of storage operations, implemented in accordance with an embodiment.

At S510, a first key associated with a first address of a memory is allocated to a first host, e.g., by an rNIC. The first host may be, for example, a processor of a client device, a virtual machine, container, or other virtualization. The first key may be an identifier used by the rNIC to uniquely identify the first address by the first host. The first key may be defined implicitly, e.g., on the rNIC, so that the second host may be able to refer to it via RDMA.

At S520, a second key associated with the first address of the memory is allocated to a second host. The second host may be a processing circuitry (or core of a multi-core processor) of an rNIC. In an embodiment, the second key may be identical to the first key, so that the same key may be allocated twice such that both hosts can refer to the same address equally. In this embodiment, the second host is allocated a second key, and the second key is associated with the first address, thereby allowing both hosts to access the same memory address.

At S530, a check is performed to determine if additional keys should be allocated. If so, execution continues at S510, otherwise execution terminates. In a non-limiting example, the check is performed by determining the size of the address space, and then checking if there are unallocated addresses.

When initiating an RDMA operation, a first host will typically send the rNIC a request with a first key, e.g., allocated by an rNIC. The first host in this example is the client device. A request for a data block stored on a remote storage device accessible via a storage server over a network is generated in response, e.g., via the rNIC. The request of the rNIC, which is a second host, includes the data block, and a second key (allocated to the second host) associated with the first memory. When the request is received, e.g., by the storage server, the storage server is responds by sending the data directly to the first address rather than going through an intermediate address which would typically be associated with the second key.

Upon completion of the response on the client memory, a completion notification is generated by the second host. The second host is configured to respond by generating a completion notification on the first host. The client device (i.e. first host) may communicate with the rNIC using different protocols, for example NVMe, NVMe-over-fabrics, or iSCSI. In certain embodiments, a plurality of first hosts may communicate with the rNIC, each utilizing a different protocol.

Figure 6:
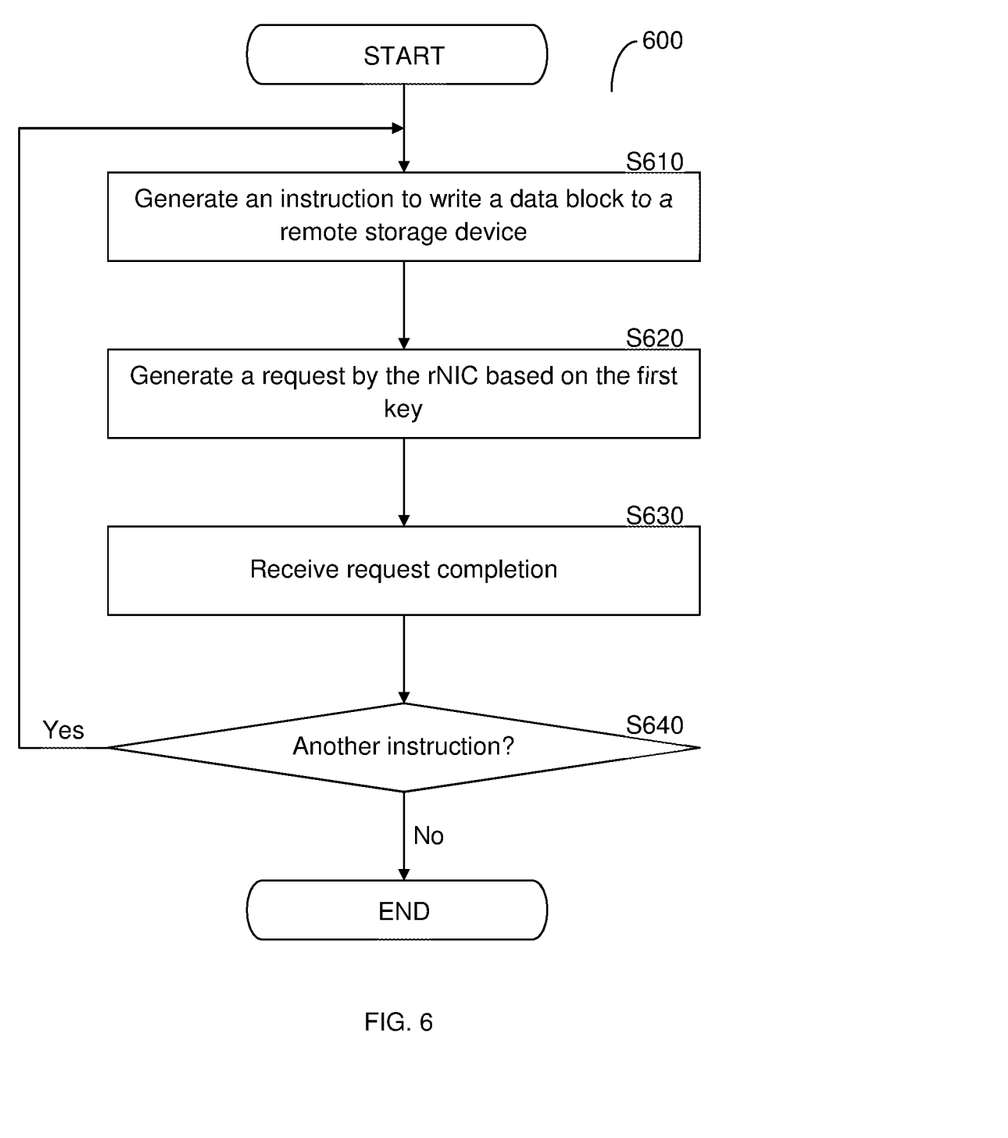
FIG. 6 is an example flowchart describing a method for performing a write operation from a client device on a remote storage device, implemented in accordance with an embodiment.

FIG. 6 is an example flowchart 600 describing a method for performing a write operation, e.g., from a client device, on a remote storage device, implemented in accordance with an embodiment.

At S610, an instruction is generated, e.g., by a client device, for an rNIC to write a data block to an address of a remote storage device, such as a remote storage device connected to a remote storage server. The instruction may include a first key associated with a first address of a client device. In some embodiments, the client device may not be aware that the remote storage device is in fact remote. For example, the remote storage device may be exposed to the client device as a virtual storage, local storage, and the like.

A virtual storage may include virtual addresses, each corresponding to a single physical address of any of a plurality of remote storage devices.

At S620, a request is generated for the remote storage device to write the data block associated with the first key to the remote storage device.

At S630, a completion response based on the first key is received in response to the remote storage device writing the data block. By using the first key, and not as previous solutions suggest using an intermediate second key, the client device receives the data block directly (without going through a memory allocated to the rNIC) and a completion indication may be sent to the rNIC. In certain embodiments, the rNIC may then generate a completion indication for the request from the first host.

At S640, a check is performed to determine if another instruction should be executed. If so, execution continues at S610, otherwise execution terminates. In some embodiments, if another instruction should be executed, execution may continue at S710 of FIG. 7, if the next instruction is a 'read' operation rather than a 'write' operation.

Figure 7:
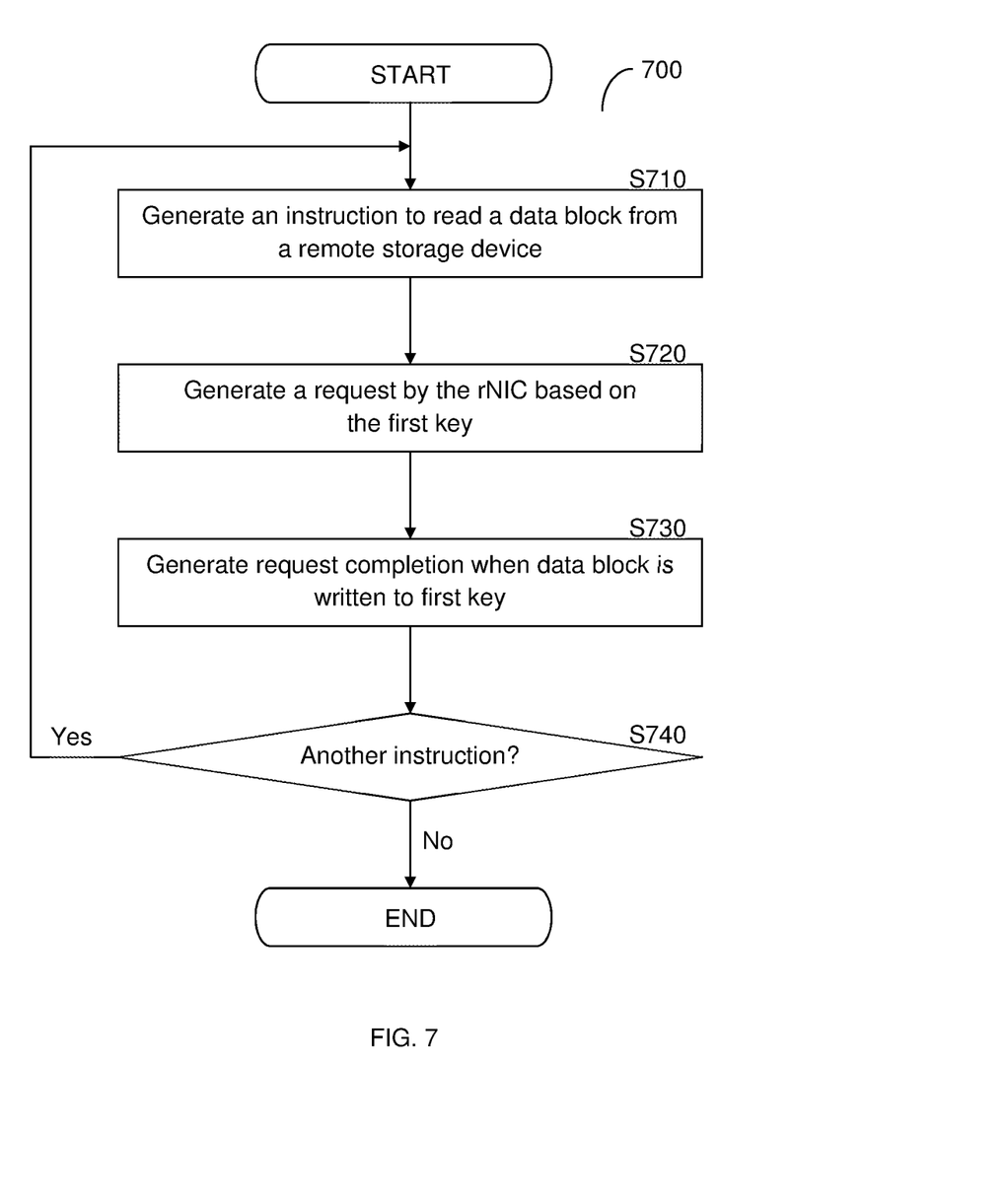
FIG. 7 is an example flowchart describing a method for performing a read operation from a client device on a remote storage device, implemented in accordance with an embodiment.

FIG. 7 is an example flowchart 700 of a computerized method for performing a read operation, e.g., from a client device, on a remote storage device, implemented in accordance with an embodiment.

At S710, an instruction is generated, e.g., from a client device, for an rNIC to read a data block from an address of a remote storage device connected to a remote storage server. The request may include a first key, allocated by the rNIC, associating the first key with a first address of the client device, into which the data block should be read. In some embodiments, the client device may not be aware that the remote storage device is in fact remote. For example, the remote storage device may be exposed to the client device as a virtual storage, local storage, etc. A virtual storage may include virtual addresses, each corresponding to a single physical address of any of a plurality of remote storage devices.

At S720, a request is generated for the remote storage device to read the data block into the memory address associated with the first key.

At S730, the remote storage server is caused to write the data block based on the first key (i.e. in the memory of the first host) in response to reading the data block from the remote storage device. By using the first rather than an intermediate second key, the first host receives the data block in a shorter time period. A completion indication is generated, e.g., by the remote storage device to the rNIC, which then generates a completion indication to the first host.

At S740, a check is performed to determine if another instruction should be executed.

If so, execution continues at S710, otherwise execution terminates. In some embodiments, if it is determines that another instruction should be executed, execution continues at S610 of FIG. 6 if the next instruction is a 'write' operation rather than a 'read' operation.

The methods described above may extend to more complex operations performed on a storage device. For example, a first host may request a data block be written to a storage device. The request includes a first key associated with a first address (or other identifier) of a data block to be written. The storage device includes a data redundancy scheme, in this example mirrored volumes. In response to receiving the request, the rNIC generates a first write instruction for a first remote storage device, and a second write instruction for a second remote storage device, which is a mirror of the first remote storage device. In other embodiments, the rNIC may generate a plurality of write instructions, each for a remote storage device. Each write instruction includes the first key. The rNIC then receives completion indications from each remote storage device, and generates a completion indication for the first host when all (or, in some embodiments, a certain number) of the remote storage devices have returned a completion indication.

In another example, the client device generates a request to write a new data block at a first memory address to a storage device having erasure coding protection, such as use of a parity volume, containing blocks which are generated by calculating a parity between, for example, a first block from a one storage device, and a second block from another storage device. In such an example, a request to write the new data block is sent to the rNIC from the first host, associated with a first key. The second host (e.g. rNIC processor) may determine to write the data block on a first storage device, and generate a parity to be written on a second storage device. The rNIC may generate a parity by reading an old parity block from the second storage device, and generating a new parity block between the old parity block and the new data block (to remove the old data block from the parity). In some embodiments, the new parity block is generated by the rNIC, in others it may be generated by the parity storage device. Once the rNIC receives a completion indication from the first storage device (where the data block was written to) and the second storage device (where the new parity block is written to), the second host generates a completion indication to the first host. The method described in U.S. patent application Ser. No. 15/684,439 assigned to common assignee and incorporated by reference herein, can be modified using the teachings herein as indicated by the above example.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for improved remote direct memory access (RDMA) for multi-host network interface controllers (NIC), the method comprising:
    allocating a first key to a first host, the first key corresponding to a first memory address of a memory device of the first host;
    allocating the first key to a second host, wherein the second host is an RDMA NIC (rNIC) configured to offload at least a portion of storage operations from the first host;
    receiving from the first host a request to perform a storage read of a first storage block on a remote storage server, the request comprising the first key; and
    sending an RDMA message to the remote storage server from the second host with the first key, such that the rNIC will write the content read from the first storage block on the first memory address associated with the first key.

2. The method of claim 1, further comprising:
    receiving from the first host a request to perform a storage write of a first storage block on a remote storage server, the request comprising the first key; and
    sending an RDMA message to the remote storage server from the second host with the first key, so that the rNIC will write the content read from the first memory address associated with the first key on the first storage block.

3. The method of claim 1, wherein the first host is a virtual host.

4. The method of claim 1, comprising a plurality of first hosts.

5. The method of claim 4, wherein one first host communicates using a first RDMA protocol, and at least another first host communicates using a second RDMA protocol.

6. A non-transitory computer readable medium having stored thereon instructions for causing a processing circuitry to perform a process, the process comprising:
    allocating a first key to a first host, the first key corresponding to a first memory address of a memory device of the first host;
    allocating the first key to a second host, wherein the second host is an RDMA NIC (rNIC) configured to offload at least a portion of storage operations from the first host;
    receiving from the first host a request to perform a storage read of a first storage block on a remote storage server, the request comprising the first key; and
    sending an RDMA message to the remote storage server from the second host with the first key, such that the rNIC will write the content read from the first storage block on the first memory address associated with the first key.

7. A system for multi-host network interface controllers (NIC), comprising:
    a processing circuitry; and
    a memory, the memory containing instructions that, when executed by the processing circuitry, configure the system to:
    allocate a first key to a first host, the first key corresponding to a first memory address of a memory device of the first host;
    allocate the first key to a second host, wherein the second host is an RDMA NIC (rNIC) configured to offload at least a portion of storage operations from the first host;
    receive from the first host a request to perform a storage write of a first storage block on a remote storage server, the request comprising the first key; and
    send an RDMA message to the remote storage server from the second host with the first key, so that the rNIC will write the content read from the first memory address associated with the first key on the first storage block.

8. The system of claim 7, wherein the system is further configured to:
    receive from the first host a request to perform a storage read of a first storage block on a remote storage server, the request comprising the first key; and
    send an RDMA message to the remote storage server from the second host with the first key, such that the rNIC will write the content read from the first storage block on the first memory address associated with the first key.

9. The system of claim 7, wherein the first host is a virtual host.

10. The system of claim 7, further comprising a plurality of first hosts.

11. The system of claim 10, wherein one first host communicates using a first RDMA protocol, and at least another first host communicates using a second RDMA protocol.

* * * * *